3,453,178
SUPERCRITICAL HETEROGENEOUS NUCLEAR REACTOR OF THE PRESSURE VESSEL TYPE
Franz Winkler, Dietheim Knödler, and Gerald Huber, Erlangen, Germany, assignors to Siemens Aktiengesellschaft, Berlin-Siemensstadt, Germany, a corporation of Germany
Filed Aug. 24, 1966, Ser. No. 574,754
Claims priority, application Germany, Aug. 26, 1965, S 99,052
Int. Cl. G21c *13/04, 3/22*
U.S. Cl. 176—54          10 Claims

ABSTRACT OF THE DISCLOSURE

A reactor core in a heterogeneous nuclear reactor of pressure vessel type moderated and cooled by the same liquid at supercritical temperature and pressure comprises a plurality of fuel elements and superheater elements, each of said fuel elements and superheater elements including a number of fuel rods in lattice-like arrangement and a number of coolant separator tubes surrounding and spaced from said fuel rods respectively, and a flow path having portions extending sequentially intermediate said coolant separator tubes, through the interior of the coolant separator tubes of said fuel elements along the fuel rods disposed therein and through the coolant separator tubes of said superheater elements, and a common moderator and coolant liquid traversing the portions of the flow path extending intermediate said coolant separator tubes and through the interior of the coolant separator tubes for said fuel elements, said liquid being vaporized in said coolant separator tubes for said fuel elements by heating action of the fuel rods therein, said vaporized liquid traversing the portion of said flow path through said coolant separator tubes for said superheater elements and absorbing heat energy from heating action of the fuel rods therein.

Our invention relates to a supercritical heterogeneous nuclear reactor of the pressure vessel type and, more particularly, a nuclear reactor which is cooled and moderated with water at supercritical pressure and supercritical temperature, the coolant and moderator therein being maintained at the same pressure as that within the pressure vessel.

In the copending application Ser. No. 477,733, filed Aug. 6, 1965, of W. Braun and F. Winkler, the latter being a joint applicant of the instant application, a supercritical heterogeneous nuclear reactor of the aforementioned general type is disclosed. The reactor core is constructed of fuel elements or rods arranged in the form of a grid or lattice, a similar lattice-like distribution of moderator elements being inserted intermediate the fuel rods. The lattice-like moderator elements are in tubular form and simultaneously serve as supply means for part or all of the cooling water and for regulating control valves located in the supply lines of the coolant and the moderator, in addition to the known control rods. Permanently adjusted throttle or choke elements are also located in the moderator tubes.

It is an object of our invention to provide a nuclear reactor of the aforementioned type of greater efficiency than heretofore known reactors of this type.

With the aforegoing and other objects in view, we provide in accordance with our invention a supercritical heterogeneous nuclear reactor of the pressure vessel type having a reactor core comprised of an assembly of a plurality of fuel elements including so-called superheater fuel elements, each formed substantially of a lattice of fuel rods, the coolant, functioning initially as moderator, being adapted to flow and vaporize between coolant divider tubes surrounding the fuel rods and then along the interior of the coolant divider tubes, and also, thereafter, to absorb the energy of the so-called superheater fuel elements. All of the fuel elements of the reactor core are the same, except that the superheater fuel elements alone, which are built into the central zone of the reactor zone, are formed with coolant divider or separator tubes having double walls instead of a single wall, because the temperature differentials between the coolant and the moderator are greater. The current flow direction of the coolant and moderator is in accordance with counterflow principles in the fuel element wherein the moderator is vaporized; however, the coolant and moderator flow in the same direction in the superheater fuel element.

Other features which are characteristic for the invention are set forth in the appended claims.

Although the invention is illustrated and described herein as embodied in supercritical heterogeneous nuclear reactor of the pressure vessel type, it is nevertheless not intended to be limited to the details shown, since various modifications and structural changes may be made therein without departing from the spirit of the invention and within the scope and range of the equivalents of the claims.

The construction and method of operation of the invention, however, together with additional objects and advantages thereof will be best understood from the following description of a specific embodiment when read in connection with the acompanying drawings, in which.

Figure 1:
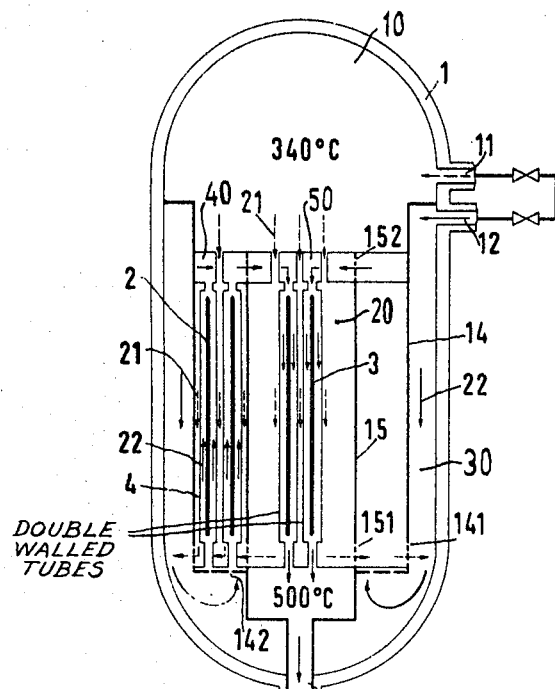
FIG. 1 is a schematic longitudinal sectional view of a nuclear reactor core constructed in accordance with the invention, showing the flow pattern of the moderator and coolant.

Referring now to the drawing, and first particularly to FIG. 1 thereof, there is shown the reactor or vessel 1, respectively supply tubes 11 and 12 for moderator and coolant, and an outlet 13 for the superheated vapor or steam produced in the reactor core. As indicated in the drawing, the superheated vapor has a temperature of substantially 500° C., whereas the inlet temperature of the coolant and the moderator is substantially 400° C. The reactor core proper is located within the supporting frame 14 which also serves as flow guide for the coolant 22. A cylindrical insert 15 is provided in the supporting frame 14 and encloses the central reactor core zone containing the superheater fuel elements 3. The ordinary fuel elements are shown purely schematically only in the form of individual fuel rods so as not to obstruct the illustration of the flow path in FIG. 1. The coolant and moderator flow path is as follows:

Water at a temperature of 340° C. and supercritical pressure is supplied through the tube 11 into the upper space 10 of the reactor pressure vessel 1. The water acting as moderating liquid 21 then flows from above into the intermediate space 20 between the separator tubes 4 surrounding the fuel rods 2 and 3 in downward direction as viewed in FIG. 1. When it reaches the lowest point, i.e. the bottom of the intermediate space, the heated moderator flows through the lateral openings 151 and 141 outwardly into the space 30 intermediate the supporting frame 14 and the pressure vessel wall 1. The moderator liquid then mixes with the coolant 22 supplied through the tube 12 and the mixture of heated moderator liquid and coolant then passes through the openings 142 of the supporting frame 14 into the separator tubes 4 and flows about the fuel rods 2 from the bottom to the top thereof as shown in FIG. 1. Above the fuel rods 2, as viewed in FIG. 1, the coolant which has vaporized in the interim flows into collecting spaces 40 and from the latter passes through the openings 152 of the inner insert cylinder 15 into collecting spaces 50 of the superheater fuel elements 3. In the superheater fuel elements 3, the vaporized coolant or steam flows only from above in a downward direction, as shown in FIG. 1, is accordingly superheated to substantially 500° C., and discharges from the reactor pressure vessel through the tube 13. To prevent very large heat losses from the moderator flowing in the same direction both inside and outside the superheater fuel elements 3 in this superheater zone, the superheater fuel elements are advantageously of double-wall construction or thermally insulated in any other suitable manner.

Figure 2:
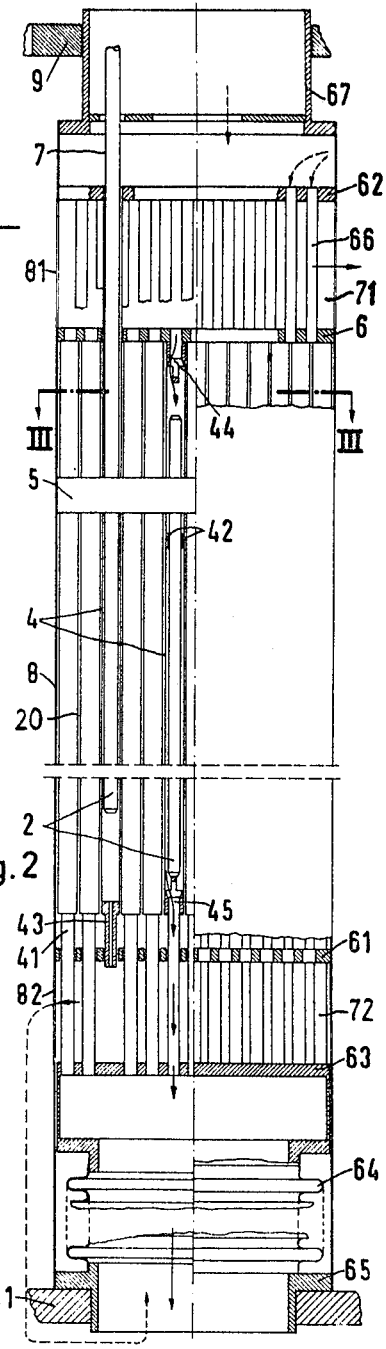
FIG. 2 is a longitudinal sectional view, partly broken away, of a fuel element forming part of the invention.

The detailed construction of the fuel element forming the reactor core is illustrated in FIG. 2. Each fuel element has an essentially closed box-like structure provided at both ends with tubes 67 and 65 which are accommodated in suitable openings of an upper and lower lattice plate 9 and 91, respectively. In the interior of each fuel element there are located fuel rods 2 in a preferably rectangular lattice arrangement. They are surrounded with clearance by coolant separator tubes 4 which are secured by a rolling mill operation or welded to an upper tube plate 6. The coolant separator tubes 4 are secured by their lower ends to the lower tube plate 63. The upper tube plate 62 is securely connected to the outer wall or sheathing 8 of the fuel element, whereas the lower tube plate 63 is freely displaceable so as to be able to take up the thermal expansions of the separator tubes 4, thereby forming a so-called "floating head." The connection of the lower tube plate 63 with the connecting tube 65 is effected elastically, for example with the aid of a bellows 64, the connecting tube 65 being in turn securely joined to the outer wall of the fuel element 8. In principle, other embodiments of a "floating head" are possible, for example by employing cylinder rings. The lower portion of the coolant separator tubes 4 has a reduced cross section and passes with clearance through an intermediate tube plate 61, which is also firmly secured to the fuel element wall 8 or held in place by the control rod guide tubes 43. The space 72 between the tube plates 61 and 63 serves as a collecting space for the moderator which penetrates thereto from the intermediate spaces 20 between the separator tubes 4 and through the annular clearance gaps in the intermediate tube plate 61. The outer wall 8 of the fuel element is provided with outlet openings 82 at the level of this space 72 so that the spaces 72 of all of the fuel elements are connected to one another when the fuel elements are inserted in the reactor. Inserts 44 and 45 are provided for supporting the fuel rods 2 within the separator tubes. The inserts 44 and 45 serve to prevent a constriction of the flow cross section for the coolant from taking place due to a possible longitudinal displacement of the fuel rod.

The tube plate 62 located above the tube plate 6, as viewed in FIG. 2, is also firmly secured to the fuel element wall 8. A large number of moderator supply tubes 66 pass through both tube plates 62 and 6 as well as the enclosed space 71 therebetween. The moderator supply tubes 66 connect the space above the tube plate 62 with the space 20 between the individual coolant separator tubes 4 in the active portion proper of the fuel element. At the level of the intermediate space 71 between the tube plates 62 and 6, the fuel element wall 8 is provided with perforations 81. The perforated wall portion 81 has its counterpart at the lower part of the fuel element wall which is similarly provided, as aforementioned, with perforations 82 below the fuel rods whereby the closely arranged fuel rods in the reactor core are given a common equalization or adjusting space above and below the active zone proper thereof. At certain fuel rod locations of this fuel rod lattice, somewhat shorter separator tubes (control rod guide tubes) 43 are inserted which are mounted at their upper and lower ends, as seen in FIG. 2, in the intermediate tube plates 6 and 61. These serve to receive finger control rods 7 which are used for controlling the reactor and which can be moved back and forth within the separator tubes 43.

Figure 3:
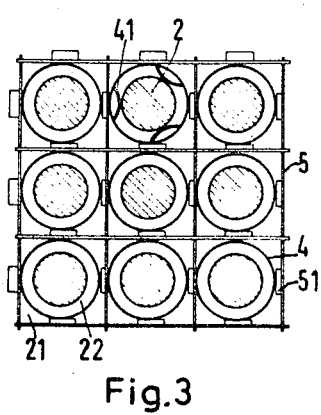
FIG. 3 is a cross-sectional view of the fuel element taken along line III—III in FIG. 2 substantially at the level of the spacer supports for the fuel element in the reactor core.

Since a very large number of fuel rods must be arranged within one of these fuel elements, usually there will be considerably more than one hundred, it is necessary to fix the mutual spacing accurately. This is effected in accordance with FIG. 3 by means of a spacer support screen of edgewise arranged rib plates formed of structural material 5. These rib plates or slats 5 are provided with projections 51 which resiliently abut against the separator tubes 4. The fuel rods 2 are centered by spacer supports 41 within the separator tubes 4, the spacer supports 41 having the appearance of undulating or wave-shaped rings, and so formed as to engage the fuel rods only at spaced points or along spaced lines.

With ordinary vaporizer fuel elements 2 which are located outside the center zone of the reactor, the moderator liquid flows through the tube 67 and passes through the moderator supply tubes 66 into the intermediate spaces 20 between the separator tubes 4. The heated moderator passes laterally out of the fuel element through the perforated wall zone 82 thereof and as shown in FIG. 1 passes into the coolant flow 22 proper. The resulting mixture then flows through the tube 65 into the fuel element, as shown by the dotted arrow at the lower left-hand side of FIG. 2, and flows within the separator tubes 4 in an upper direction from below as shown in FIG. 1. Above the upper portion of the fuel element, the coolant-moderator mixture passes again through the perforated zone 81 of the fuel element and unites with the coolant flows of the adjacent fuel elements. Due to the supercritical pressure and the heating to supercritical temperatures along this flow path, the coolant possesses a vapor-like or steam-like characteristic and passes as shown in FIG. 1 into the superheater fuel elements 3 and flows therein in a direction from the top to the bottom. The superheater fuel elements 3 differ from the aforedescribed vaporizer elements only in that the coolant separator tubes 4 thereof are of thermally insulating construction such as, for example by being double-walled. In these coolant channels, the steam or vapor is heated further to substantially 500° C. The flow direction of the moderator remains the same so that both the vaporized coolant and the liquid moderator flow in the same direction from above downwardly along the superheater fuel elements 3.

In order to present a further conception of the size and the geometric proportions of relationships of such a reactor, the following brief data are given which, however, are considered in no way to limit the invention but to be solely one possible example of the invention of the instant application.

The reactor core for a nuclear power station with a capacity of 30 megawatts (mw.) of electrical power consists, for example of about 90 fuel elements of which 52 are formed as vaporizer elements and 38 as superheater elements in the interior zone of the reactor core. The inlet temperature, as previously mentioned, is approximately 340° C. whereas the outlet temperature of the superheated vapor or steam is approximately 500° C. The outlet temperature of the steam or vapor at the vaporizer elements is thereby substantially 400° C. The coolant throughput through the vaporizer elements is adjusted by a throttle plate, located in front of the coolant channel inlet but not otherwise shown in the drawing, to the capacity or the power provided by the individual fuel elements, so that the outlet temperatures are approximately the same. The fuel material consists for example of enriched uranium dioxide tablets. The containment tubes for the fuel attain temperatures of 600 to 650° C. during operation of the reactor. They consist of Incaloy, for example. The spacer supports proper are of resilient material such as stainless steel, for example.

To control the reactor, a variation in the moderator temperature can be employed instead of the use of finger control rods. This can be effected in the manner disclosed in the aforementioned copending application Ser. No. 477,733 by employing suitable throttling valves in the supply conduits for the moderator and the coolant proper.

We claim:

1. In a heterogeneous nuclear reactor of pressure vessel type moderated and cooled by the same liquid at supercritical temperature and pressure, a reactor core comprising a plurality of fuel elements and superheater elements, each of said fuel elements and superheater elements including a number of fuel rods in lattice-like arrangement and a number of coolant separator tubes surrounding and spaced from said fuel rods respectively, and a flow path having portions extending sequentially intermediate said coolant separator tubes, through the interior of the coolant separator tubes of said fuel elements along the fuel rods disposed therein, and through the coolant separator tubes of said superheater elements, and a common moderator and coolant liquid traversing the portions of the flow path extending intermediate said coolant separator tubes and through the interior of the coolant separator tubes for said fuel elements, said liquid being vaporized in said coolant separator tubes for said fuel elements by heating action of the fuel rods therein, said vaporized liquid traversing the portion of said flow path through said coolant separator tubes for said superheater elements and absorbing heat energy from heating action of the fuel rods therein.

2. Heterogeneous nuclear reactor according to claim 1, wherein said superheater elements differ from said fuel elements in that they have heat-insulated double walled coolant separator tubes whereas said fuel elements have single walled coolant separator tubes, and said superheater elements are located in the center of said reactor core.

3. Heterogeneous nuclear reactor according to claim 2, wherein the flow path portion intermediate said coolant separator tubes extends in a direction counter to the direction wherein the flow path portion of said fuel elements extends, and extends in the same direction as that of the flow path portion of said superheater elements.

4. Heterogeneous nuclear reactor according to claim 1, including collection spaces for the moderator and coolant liquid located at both ends of said fuel elements above and below the fuel rods therein.

5. Heterogeneous nuclear reactor according to claim 4, wherein said fuel elements are provided with a peripheral metal sheathing for housing the fuel rods and coolant separator tubes therein, said sheathing being formed with lateral perforations at the level of said collection spaces.

6. Heterogeneous nuclear reactor according to claim 1, wherein each of said fuel elements has an outer sheathing for housing the fuel rods and coolant separator tubes therein and is provided with an inner tube plate firmly connected to said sheathing, said coolant separator tubes being in turn firmly connected at one end thereof to said tube plate and at the other end thereof to another tube plate displaceable relative to said fuel element sheathing so as to allow for compensation of thermal expansion of said coolant separator tubes.

7. Heterogeneous nuclear reactor according to claim 1, including axially extending inlet and outlet tubes at opposite ends of said fuel elements for respectively supplying thereto and discharging therefrom moderator and coolant liquid, said reactor core having a support frame formed with an upper and a lower perforated grid plate, said inlet and outlet tubes of said fuel elements being fitted in corresponding performations of said upper and lower grid plates.

8. Heterogeneous nuclear reactor according to claim 1, including spacer supports in the form of a screen grid having inwardly extending projections in the individual mesh thereof, said coolant separator tubes being received respectively in said mesh and held in position therein by said projections, and additional spacer supports in said coolant separator tubes for centering the fuel rods respectively therein.

9. Heterogeneous nuclear reactor according to claim 8, wherein said additional spacer supports are in the form of rings having an undulating surface.

10. Heterogeneous nuclear reactor according to claim 1, including finger control rods insertable at predetermined fuel rod positions in said fuel elements and displaceable therein for controlling the reactor.

References Cited

UNITED STATES PATENTS

| | | | |
|---|---|---|---|
| 3,034,977 | 5/1962 | Holl et al. | 176—54 |
| 3,049,487 | 8/1962 | Harrer et al. | 176—54 |
| 3,185,630 | 5/1965 | Ammon | 176—54 |
| 3,228,854 | 1/1966 | Bekkering et al. | 176—78 |
| 3,243,351 | 3/1966 | Campbell et al. | 176—54 |
| 3,314,859 | 4/1967 | Anthony | 176—50 |

BENJAMIN R. PADGETT, *Primary Examiner.*

R. L. GRUDZIECKI, *Assistant Examiner.*